United States Patent [19]

Aepli et al.

[11] 3,873,743

[45] *Mar. 25, 1975

[54] METHOD FOR PEELING CASHEW NUTS

[75] Inventors: Otto T. Aepli, Southgate; Malachy E. Sorgenfrei, Ypsilanti, both of Mich.

[73] Assignee: BASF Wyandotte Corporation, Wyandotte, Mich.

[*] Notice: The portion of the term of this patent subsequent to Mar. 12, 1991 has been disclaimed.

[22] Filed: Apr. 24, 1972

[21] Appl. No.: 247,153

Related U.S. Application Data

[63] Continuation-in-part of Ser. No. 160,906, July 8, 1971, Pat. No. 3,796,817.

[52] U.S. Cl. ............................ 426/253, 426/288
[51] Int. Cl. ............................ B65b 55/06
[58] Field of Search............ 99/233.3, 233.4, 233.5, 99/126, 231; 426/287, 353, 482, 251, 253, 254, 255, 257, 288

[56] References Cited
UNITED STATES PATENTS

| 1,453,871 | 5/1923 | Ash | 426/287 |
|---|---|---|---|
| 1,558,963 | 10/1925 | Christie | 426/255 |
| 2,223,168 | 11/1940 | Dombrow | 426/287 |
| 2,515,625 | 7/1950 | Almquist | 99/231 X |
| 2,829,055 | 7/1958 | Ozai-Durrani | 426/482 |
| 3,023,110 | 2/1962 | Stagmeier | 426/353 |
| 3,168,406 | 2/1965 | Moshy | 426/254 |
| 3,228,774 | 1/1966 | Sanders | 99/126 |
| 3,294,549 | 12/1966 | Vix | 99/126 |
| 3,307,601 | 3/1967 | Aepli | 426/287 |
| 3,796,817 | 3/1974 | Aepli | 426/287 |
| R18,703 | 12/1932 | Bizell | 99/126 X |

FOREIGN PATENTS OR APPLICATIONS

| 18,588 | 5/1971 | Japan | 426/253 |
|---|---|---|---|

*Primary Examiner*—Robert Halper
*Attorney, Agent, or Firm*—Joseph D. Michaels; Bernhard R. Swick; Robert E. Dunn

[57] ABSTRACT

The skins of nut meats or kernels are effectively removed by immersing the unpeeled nut in an aqueous acid-surfactant solution to loosen the skin and, thereafter, washing the so-treated kernel, immersing the kernel in a decolorizing bath, polishing the kernel and then drying the kernel.

6 Claims, No Drawings

METHOD FOR PEELING CASHEW NUTS

CROSS-REFERENCE TO RELATED APPLICATIONS

This application is a continuation-in-part application of copending U.S. Pat. application Ser. No. 160,906, filed July 8, 1971, now U.S. Pat. No. 3,796,817.

BACKGROUND OF THE INVENTION

1. Field of the Invention

The present invention pertains to the peeling of nuts. More particularly, the present invention pertains to cashew nuts and methods for removing the skin therefrom leaving a substantially peeled whole kernel without any discoloration.

2. Prior Art

The use of chemical and mechanical processes for the removal of skins from the kernels of nuts has been long known. Today, the most prevalent chemical methods involve subjecting the skin-carrying kernel to an alkaline solution along with agitation or other mechanical action to release the skin therefrom.

The use of alkaline solutions is disadvantageous since the pigments or tannins of the skin tend to deposit within the skinned kernel by diffusing into the kernel at the intersection of the two halves, thereby, giving a permanent discoloration to the so-treated kernel, thus rendering it unsuitable for sale.

Mechanical action tends to break the kernel into its respective halves and/or other fragmentary sections. Thus, either singular or cooperative action between alkaline solutions and mechanical action creates a most undesirable environment for processing cashew nuts and the like.

Thus, to obviate this situation, the above-identified copending application, the disclosure of which is hereby incorporated by reference, teaches the use of certain acid- surfactant aqueous solutions to loosen the skin of the kernel followed thereafter by the washing of the kernel to effectively remove the skin therefrom.

However, it has been found that, in commercial utilization of the process of the copending application, repeated use of the peeling liquor results in a colorization of late-treated kernels, and decolorization of the kernel is not effectuated by antioxidant treatment or washing. Thus, the present invention seeks to obviate this problem whereby the peeling liquor can be used repeatedly without the colorization of the late-treated kernels, i.e., those kernels treated in a peeling solution or liquor which has been utilized many times previously.

SUMMARY OF THE INVENTION

The present invention provides a process wherein the cashew nut kernels or other similar kernels with skins removed by the process of the copending application are effectively decolorized by a process which includes the steps of:

a. drying the kernel to a moisture content under 3% prior to immersion in the peeling liquor, and b. after washing the kernel to remove the skin therefrom immersing the kernel in a decolorizing aqueous solvent-acid solution, and then c. drying the kernel to produce the final product.

By employing the present process, it is possible to produce cashew nut kernels or other nut meats of reduced breakage and which are not discolored.

For a more complete understanding of the present invention, reference is made to the following detailed description and examples thereof.

DESCRIPTION OF THE PREFERRED EMBODIMENT

In accordance with the invention of the copending application, nut kernels such as cashews, peanuts and the like, and in particular cashew nuts, have their outer skin effecitvely removed therefrom by a process which generally comprises:

a. immersing the skin-covered kernel in an aqueous acid-surfactant peeling solution or peeling liquor to loosen the skin, b. washing the so-treated kernel to remove the skin, and c. drying the kernel.

It has been found that by using an aqueous acid-surfactant solution for immersing the kernels to loosen the skin, the problem of discoloration within the kernel is eliminated on a small or pilot scale. However, as noted, on a commercial scale repeated use of the peeling liquor results in discoloration of the kernels. Therefore, the present invention provides an improved process which obviates this problem and which generally comprises:

a. drying the kernel to a moisture content under 3%, b. immersing the dried kernel in an aqueous acid-surfactant peeling solution to loosen the skin, c. washing the so-treated kernel to remove the skin, d. immersing the kernel in a decolorizing bath, and e. drying the kernel.

The initial drying stage provided herein renders the kernels more amenable to the peeling liquor, thereby facilitating loosening of the skin as well as rendering the kernel more receptive to the decolorizing treatment. Although this drying step was optional in the process of the copending application, it is essential hereto.

The initial drying stage is maintained for a sufficient period of time and temperature to reduce the moisture content of the kernel to under 3%, preferably about 2%. This is generally achieved by exposing the de-shelled kernel to hot air for about 10 minutes 400 minutes, the hot air being at a temperature ranging from about 100° to 500°F. Preferably, hot air exposure for about 100 minutes to 200 minutes, with the hot air at a temperature of from about 180° to 220°F. will ensure the reduction of the moisture content of the kernel to about 2%.

As defined in the copending application, the aqueous acid-surfactant peeling liquor generally contains from about 0.1 to 50% by weight of acid, based on the weight of the solution, and from about 0.1 to 10% by weight of surfactant, based on the weight of the solution, and preferably consists essentially of a 1.1 to 17.0% aqueous acid-surfactant solution containing from about 1.0% to 12.0% by weight of acid and from about 0.1 to 5% by weight of surfactant.

The acids which can be used in the peeling solution can be either organic or inorganic, weak or strong acids, for example, acetic acid, trichloroacetic acid, gluconic acid, hydroxyacetic acid, phosphoric acid, sulfuric acid, hydrochloric acid, nitric acid, and the like, as well as mixtures thereof and, also, mixtures of inorganic and organic acids.

The surfactant used to prepare the peeling liquor varies widely also. Thus, nonionic surfactants, anionic surfactants, cationic surfactants, amphoteric surfactants or mixtures thereof can be used. The only criterion associated with the surfactant is that it be soluble in the acid and possess the necessary wetting and penetrating properties. The chemical nature of the peeling liquor is, as noted, particularly defined in the copending application.

The immersion step in the peeling liquor is generally carried out by immersing, with agitation, previously deshelled nut kernels in peeling liquor for a period ranging from about 0.5 minute to 15 minutes while maintaining the solution at a temperature ranging from about 80°F. to about 210°F. By operating within these parameters, the skins of the kernels are sufficiently loosened to facilitate their complete removal. Complete removal of the skin in the peeling liquor is undesirable since the skin would only accumulate therein. It should be noted that the actual immersion time is governed by the design of the equipment used.

After the immersion step is completed, the nut kernels are removed from the solution and are washed with water delivered to the kernels under a pressure ranging from about 5 psi to 100 psi. This pressure, while being sufficient to remove the skin of the kernel, is insufficient to cause any appreciable breakage of the whole kernel. The washing step can be carried out on a linear conveyor, a reel, rotary type washer, or like apparatus with the washing means, such as sprayer heads, nozzles, or the like disposed in close proximity thereto.

Further, in accordance with the present invention, after the washing step during which the skins are removed from the kernels, the kernels are subjected to a decolorizing treatment by contacting the kernels with a decolorizing solution. This stage of the process, while decolorizing the kernels, simultaneously, enhances the flavor thereof and concomitantly eliminates the need for antioxidant treatment.

The decolorizing bath employed herein consists essentially of a water-soluble or water-miscible organic solvent, an acid and water. Generally, the decolorizing bath will consist essentially of from about 40 to 80% by weight of solvent, from about 0.1 to 5% by weight of acid and the balance water, all percentages being based on the total weight of the bath. Preferably, the bath contains from about 40 to 60% by weight of solvent, from about 0.1 to 1% by weight of acid, and the balance water.

It is contemplated that any water-soluble or water-miscible organic solvent can be used herein. Examples of such solvents include linear and branched-chain aliphatic alcohols, glycols, and higher functionality hydroxyl compounds (polyhydroxyl). Representative aliphatic alcohols include ethanol, propanol, isopropanol, butanol, isobutanol, t-butanol, n-propanol, and the like. Useful glycols or diols include ethylene glycol, propylene glycol, 1,4-butane diol, 1,3-butane diol, and the like. Higher functionality hydroxyl compounds include glycerine, trimethylolpropane, 1,4,6-hexane triol, and so forth. Other useful water-miscible solvents include butyl cellosolve, ethyl acetate and the like. It is to be understood that mixtures of solvents can be used. In the practice of the present invention the preferred solvent is ethanol.

The acids which can be used in preparing the decolorizing bath may be either inorganic or organic, weak or strongly acidic compounds. Representative useful acids include, for example, sulfuric acid, phosphoric acid, hydrochloric acid, acetic acid, hydroxyacetic acid, trichloroacetic acid, citric acid, lactic acid, gluconic acid, and the like, as well as mixtures thereof. In practicing the present invention the preferred acid is a mineral acid, as represented by sulfuric acid, phosphoric acid, hydrochloric acid and mixtures thereof, and in particular hydrochloric acid.

It should be noted that nitric acid, although omitted from the listed representative mineral acids, is within the scope of the invention, but due to its toxicity in food processing is not a preferred mineral acid.

The decolorizing bath is prepared by conventional technique by merely mixing the ingredients together in accordance with accepted practices.

The decolorizing stage of the present process is carried out at ambient conditions by contacting the washed kernel therewith, usually by immersion or spraying, for a period of from about ½ minute to 3 minutes and, preferably, from about 1 to 2 minutes.

In conducting the decolorizing stage of the process, it is preferred that this be conducted in a step-wise procedure wherein the kernels are contacted with a first decolorizing bath to expunge any tannin colorization therefrom, followed thereafter by contacting the kernels with a second decolorizing bath, the composition of which is the same as the first bath and the same as that described above.

This procedure is preferred since there is effectuated thereby a decolorization of the kernel with the first bath and a "polishing" thereof with the second decolorizing bath. By using a unitary step polishing is not achieved.

It should also be noted that the decolorizing bath need not be discarded, but can be regenerated and recycled. Regeneration can be accomplished either by a conventional distillation separation or by treating the bath with synthetic polymeric absorbents, such as those sold by Rohm and Haas under the name AMBERLITE or with activated charcoal.

After the decolorizing is completed the kernels are removed from the bath and the surface solvent expunged therefrom by forced air or other suitable means.

Thereafter, the kernels are then dried by any suitable method such as air drying or the like. The dried kernels are then usually boiled or roasted in oil to provide the final edible product.

As hereinabove noted, when the present process is utilized to peel cashew kernels, the final products are cream-colored kernels bearing no discoloration and essentially whole in nature.

For a more complete understanding of the present invention, reference is made to the following examples of the present invention. In the examples all parts, absent indications to the contrary, are by weight.

EXAMPLE I

Raw cashew kernels (approximately 6.0–9.0% moisture content) are heated in a constant temperature oven at 200°F. for 200 minutes. After the heating process the moisture level is approximately 2.0–2.5%.

The preheated and dried kernels are then immersed for 3 minutes in an aqueous solution containing 3.0% of a peeling compound which is a mixture of 30% by weight octyl benzene sulfonic acid and 70 of 75% phosphoric acid. The temperature of the peeling solution is 160°F.

The kernels are removed from the peeling bath and washed with fresh water sprays at 70 pounds per square inch to remove the loosened skin. Thereafter, the kernels are immersed in a decolorizing solution, which consists of 60% ethyl alcohol, 0.5% concentrated hydrochloric acid and the balance water, for one minute. The temperature of the decolorizing solution is 90°F.

The blanched and destained kernels are then heated in an oven at 180° to 200°F. to the desired moisture level (5–6%). The peeled kernels are checked for discoloration by halving various random samples thereof. No discoloration was noted.

EXAMPLE II

The procedure of Example I is duplicated employing various decolorizing baths, as set forth below. In each instance, the method results in substantially 100% of skin removal, little or no breakage of the kernels and no discoloration thereof.

| Bath A | | Bath B | |
|---|---|---|---|
| Ingredient | Amt., p.b.w. | Ingredient | Amt., p.b.w. |
| Ethylene Glycol | 40.0 | Glycerine | 60.0 |
| Phosphoric Acid | 1.0 | Hydrochloric Acid | 0.3 |
| Water | 59.0 | Water | 39.7 |

| Bath C | | Bath D | |
|---|---|---|---|
| Ingredient | Amt., p.b.w. | Ingredient | Amt., p.b.w. |
| Ethanol | 80.0 | Isopropanol | 60.0 |
| Acetic Acid | 2.0 | Sulfuric Acid | 0.5 |
| Water | 18.0 | Water | 39.5 |

EXAMPLE III

The procedure of Example I is repeated using various aqueous acid-surfactant peeling solutions, as set forth below. In each instance, the method results in substantially 100% of removal of the skin, little or no breakage of the kernels and no discoloration thereof.

| Solution A | | Solution B | |
|---|---|---|---|
| Ingredient | Amt., p.b.w. | Ingredient | Amt., p.b.w. |
| Amphoteric Surfactant[1] | 2.0 | Amphoteric Surfactant[1] | 2.0 |
| Nitric Acid | 10.0 | Sulfuric Acid | 10.0 |
| Water | 88.0 | Water | 88.0 |

| Solution C | | Solution D | |
|---|---|---|---|
| Ingredient | Amt., p.b.w. | Ingredient | Amt., p.b.w. |
| Linear Alkylbenzene Sulfonic Acid[2] | 4.0 | Octyl Benzene Sulfonic Acid | 3.00 |
| Sulfuric Acid | 5.0 | Phosphoric Acid | 3.75[3] |
| Isopropyl Alcohol | 10.0 | Ethyl Alcohol | 10.00 |
| Water | 81.0 | Water | 83.25 |

| Solution E | | Solution F | |
|---|---|---|---|
| Ingredient | Amt., p.b.w. | Ingredient | Amt., p.b.w. |
| Linear Alkylbenzene Sulfonic Acid[2] | 4.0 | Amphoteric Surfactant[1] | 4.0 |
| Trichloroacetic Acid | 5.0 | Phosphoric Acid | 5.0 |
| Isopropanol | 10.0 | Butyl Cellosolve | 10.0 |
| Water | 81.0 | Water | 81.0 |

[1] N-lauryl myristyl B-amino propionic acid.
[2] UCANE 11, a linear alkylbenzene sulfonic acid sold by Union Carbide and having 11 carbon atoms in the alkyl group.
[3] Five parts of a 75% phosphoric acid solution in water.

The embodiments of the invention in which an exclusive property or privilege is claimed are defined as follows:

1. A method for peeling nut kernels comprising:
    a. drying the kernels to a moisture content of under 3%,
    b. immersing the kernels for a period of about 0.5 minute to 15 minutes in a 1.1 to 17.0% by weight aqueous acid-surfactant solution, the solution being maintained at a temperature ranging from about 80° to 210°F., to loosen the skin from the kernel,
    c. washing the kernels to remove the skin therefrom,
    d. contacting the kernels with a decolorizing bath consisting essentially of
        1. from about 40 to 80% by weight of a water-miscible organic solvent,
        2. from about 0.1 to 5% by weight of a mineral acid, and
        3. the balance water, all weights based on the total weight of the bath, and
    e. drying the kernels.

2. The method of claim 1 wherein the decolorizing bath consists essentially of from about 40 to 60% by weight of the solvent and from about 0.1 to 1% by weight of acid and the balance is water, all weights being based on the total weight of the bath.

3. The method of claim 1 wherein the solvent is selected from the group consisting of alkanols, glycols, polyhydroxyl compounds, butyl cellosolve, ethyl acetate, and mixtures thereof.

4. The method of claim 1 wherein the acid is selected from the group consisting of sulfuric acid, hydrochloric acid, phosphoric acid, and mixtures thereof.

5. The method of claim 1 wherein the solvent is ethanol.

6. The method of claim 1 wherein the kernels are contacted with a first decolorizing bath to expunge the tannin colorization therefrom and with a second decolorizing bath to polish the decolorized kernels.

* * * * *